(No Model.)
E. NORTON.
CAN SOLDERING MACHINE.
No. 382,320. Patented May 8, 1888.
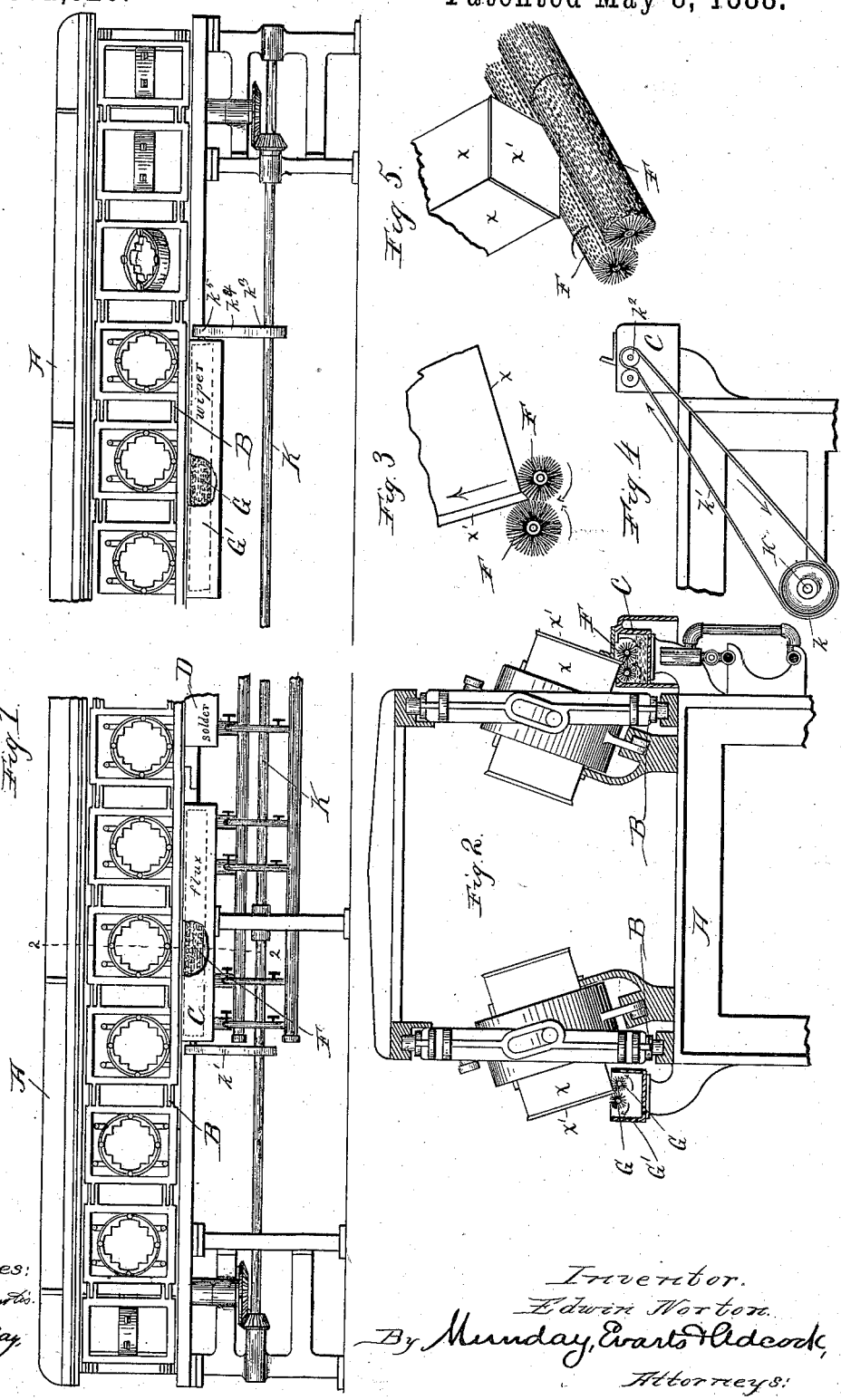
Witnesses:
Inventor.
Edwin Norton.
By Munday, Evarts & Adcock,
Attorneys.

UNITED STATES PATENT OFFICE.

EDWIN NORTON, OF MAYWOOD, ASSIGNOR TO HIMSELF AND OLIVER W. NORTON, OF CHICAGO, ILLINOIS.

CAN-SOLDERING MACHINE.

SPECIFICATION forming part of Letters Patent No. 382,320, dated May 8, 1888.

Application filed March 12, 1888. Serial No. 266,945. (No model.)

*To all whom it may concern:*

Be it known that I, EDWIN NORTON, a citizen of the United States, residing at Maywood, in the county of Cook and State of Illinois, have invented a new and useful Improvement in Machines for Soldering Sheet-Metal Cans, of which the following is a specification.

My invention relates to machines for soldering sheet-metal cans, and more particularly to the means for applying the flux and wiping off or removing the surplus solder from the seam or joint.

The invention consists, in connection with a suitable can-carrier of any well-known construction and a flux-containing vessel, of a pair of long revolving brushes which revolve in the flux and between which the corner or seam of the can rolls as the can is advanced along by the can-carrier. By this means rosin or other suitable flux may be perfectly rubbed into the seam, the same as it is done by hand in hand soldering.

The invention also consists, in connection with the can-carrier and a solder bath in which the corner or seam of the can is immersed, of a pair of long revolving wipers or brushes, between which the corner or seam of the can rolls as it advances in the carrier, while the brushes or wipers revolve together and effectually remove any surplus solder from the outside of the can.

My invention may be applied to any suitable form of soldering-machine having any well-known form of can-carrier—as, for example, those shown in the patents of the United States heretofore granted. For convenience of illustration I have shown my invention as applied to the soldering-machine shown and described in Letters Patent No. 354,731, dated December 21, 1886.

In the accompanying drawings, which form a part of this specification, and in which similar letters of reference indicate like parts, Figure 1 is a side elevation of a machine embodying my invention, a portion of the middle part thereof being broken away. Fig. 2 is an enlarged detail cross-section on line 2 2 of Fig. 1. Fig. 3 is an enlarged sectional view of the flux-applying brushes. Fig. 4 is an end view showing the mechanism for driving the revolving brushes, and Fig. 5 is a perspective view of the wiping-brushes.

In said drawings, A represents the frame of a can-soldering machine; B, the can-carrier by which the cans are advanced along and over the flux or rosin tank C and the solder bath D. This carrier is adapted to roll or revolve the cans as they advance along, as is fully shown and described in said patent before referred to. The particular construction of this soldering-machine and can-carrier I do not deem it necessary for a full understanding of my present improvement to here show or describe, as its construction is well known to those skilled in the art, as it is fully shown and described in said prior patent, No. 354,731, to which reference is hereby made, and as my present improvement is equally applicable to other well-known forms of soldering-machines and can-carriers, and whether the same be for soldering round or square cans.

F F are a pair of long preferably cylindrical flux or rosin applying brushes journaled in suitable bearings in the flux-tank C and along the path of the can as it advances in the carrier. These brushes are journaled in the flux-tank C, so that they will revolve in the flux and wipe the same against the corner seam of the can as the can revolves and rolls along in its carrier in contact with the brushes. The brushes may be made of any suitable material, and one of the brushes F may preferably be made of larger diameter than the other brush F, or else be journaled slightly above the brush F, as is clearly indicated in the drawings. This is owing to the fact that the side $x$ of the can stands at a less inclination to the horizon than the end $x'$ of the can as the same is advanced along by the carrier.

G G are a pair of long revolving wiping-brushes, between which the can rolls or revolves after it leaves the solder bath D. These brushes or wipers may be made of any suitable material, but preferably of bristles or asbestus fiber secured to a suitable head or shaft. These long preferably cylindrical wipers are located immediately after the solder bath D and along the path of the can as it advances in the carrier, so that the corner of the can will roll between and in contact with these wipers, and all surplus solder be wiped or removed from the outside of the can. These long revolving wipers are journaled on the frame of the machine, and beneath them is arranged a receptacle, G', to catch the surplus solder removed from the can. The wipers should equal in length the periphery of the can, so that every portion of the seam may be wiped as the can rolls between the revolving wipers, and they may preferably be made two or three times the length of the periphery of the can, so that each part of the seam will come twice or more in contact with the brushes. The flux or rosin applying brushes F F are driven from the main shaft K of the machine by a pulley, $k$, thereon and a belt or chain, $k'$, which runs on a pulley, $k^2$, on the shaft of one of the brushes F F. Any other suitable means may, however, be employed for communicating motion to the revolving brushes from any moving part of the soldering-machine. It is necessary to directly drive but one of the revolving brushes, as the other will be readily driven by contact with its fellow. If it is desired, however, the shaft of the two brushes may be geared together or each independently driven. The wipers G G, or one of them, is driven from the same shaft K through a pulley, $k^3$, belt $k^4$, and pulley $k^5$.

I hereby disclaim as not of my invention the devices shown and described in the following patents, to wit: No. 224,771, dated February 24, 1880; No. 297,600, dated April 29, 1884, and No. 358,516, dated March 1, 1887.

I claim—

1. The combination, with a soldering-machine and its can-carrier, of a flux-tank and a pair of long flux-applying brushes revolving in the flux contained in said tank and arranged parallel to the path of the can as it advances in said carrier, the revolution of the brush being transverse to the direction of movement of the can in the carrier, substantially as specified.

2. The combination, with a can-carrier, of a flux-tank and a long flux-applying brush revolving in the flux and arranged parallel to the path of the can as it advances in the carrier, the revolution of the brush being transverse to the direction of movement of the can in the carrier, substantially as specified.

3. The combination, with a can-carrier adapted to revolve the can as it advances, of a long revolving flux-applying brush parallel to the path of the revolving can as it revolves and advances in said carrier, the revolution of the brush being transverse to the direction of movement of the can in the carrier, substantially as specified.

4. The combination, with a can carrier, of a pair of long revolving wipers parallel to the path of the can as it advances in said carrier, substantially as specified.

5. The combination, with a can-carrier, of a long revolving wiper parallel to the path of said can-carrier, substantially as specified.

6. The combination of a solder bath, a carrier device for revolving and advancing the can, and a long cylindrical revolving wiper, substantially as specified.

7. The combination, with a solder bath, a can-carrier adapted to advance and revolve the cans, and a pair of long revolving wipers parallel to the path of said carrier, substantially as specified.

EDWIN NORTON.

Witnesses:
 H. M. MUNDAY,
 EDMUND ADCOCK.